United States Patent
You

(10) Patent No.: US 12,457,077 B2
(45) Date of Patent: Oct. 28, 2025

(54) METHOD FOR INFORMATION CONFIGURATION FOR TRANSMITTING SRS AND TERMINAL DEVICE

(71) Applicant: GUANGDONG OPPO MOBILE TELECOMMUNICATIONS CORP., LTD., Guangdong (CN)

(72) Inventor: Xin You, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 358 days.

(21) Appl. No.: 18/068,876

(22) Filed: Dec. 20, 2022

(65) Prior Publication Data

US 2023/0119824 A1    Apr. 20, 2023

Related U.S. Application Data

(63) Continuation of application No. PCT/CN2020/103090, filed on Jul. 20, 2020.

(51) Int. Cl.
*H04L 5/00* (2006.01)
*H04W 76/34* (2018.01)

(52) U.S. Cl.
CPC .......... *H04L 5/0051* (2013.01); *H04W 76/34* (2018.02)

(58) Field of Classification Search
CPC .............................. H04L 5/0051; H04W 76/34
See application file for complete search history.

(56) References Cited

U.S. PATENT DOCUMENTS

| | | | |
|---|---|---|---|
| 2019/0215217 A1* | 7/2019 | Kim | H04L 5/0048 |
| 2021/0297959 A1* | 9/2021 | Zhou | H04W 74/0833 |
| 2021/0377904 A1* | 12/2021 | Huang | H04W 56/006 |
| 2021/0400734 A1* | 12/2021 | Zhang | H04W 52/0238 |
| 2022/0045810 A1* | 2/2022 | Yang | H04L 5/001 |
| 2022/0116888 A1* | 4/2022 | Si | H04W 52/242 |
| 2023/0180023 A1* | 6/2023 | Yang | H04L 5/0051 |
| | | | 370/329 |

FOREIGN PATENT DOCUMENTS

| | | |
|---|---|---|
| CN | 107959971 | 4/2018 |
| CN | 109698739 | 4/2019 |
| CN | 110650548 | 1/2020 |
| CN | 111343567 | 6/2020 |
| EP | 3923651 | 12/2021 |
| EP | 4149181 | 3/2023 |

OTHER PUBLICATIONS

EPO, Communication for EP Application No. 20946335.5, Sep. 16, 2024.

(Continued)

*Primary Examiner* — Derrick V Rose
(74) *Attorney, Agent, or Firm* — Hodgson Russ LLP

(57) ABSTRACT

A method for information configuration for transmitting a sounding reference signal (SRS) and a terminal device are provided. The method includes receiving from a network device configuration information for the SRS, where the configuration information is for the terminal device to transmit the SRS in a non-connected state.

13 Claims, 4 Drawing Sheets

(56) References Cited

OTHER PUBLICATIONS

EPO, Extended European Search Report for EP Application No. 20946335.5, Jun. 23, 2023.
EPO, Communication for EP Application No. 20946335.5, Mar. 13, 2024.
WIPO, International Search Report and Written Opinion for International Application No. PCT/CN2020/103090, Apr. 23, 2021.
"3rd Generation Partnership Project; Technical Specification Group Radio Access Network; NR; Radio Resource Control (RRC) protocol specification (Release 16)," 3GPP TS 38.331, Mar. 2020, v16.0.0.

* cited by examiner

METHOD FOR INFORMATION CONFIGURATION FOR TRANSMITTING SRS AND TERMINAL DEVICE

CROSS-REFERENCE TO RELATED APPLICATION(S)

This application is a continuation of International Application No. PCT/CN2020/103090, filed Jul. 20, 2020, the entire disclosure of which is incorporated herein by reference.

TECHNICAL FIELD

This application relates to the field of communication technology, and in particular to a method for information configuration for transmitting a sounding reference signal (SRS) and a terminal device.

BACKGROUND

Positioning is widely used in daily life. Requirements for latency and accuracy of the positioning are becoming stricter. Sounding reference signal (SRS) is one of the main reference signals used in positioning. A network device can measure a time of arrival, a signal strength, an angle of arrival and other parameters based on an SRS transmitted by a terminal device, and determine location information of the terminal device according to these parameters. At present, configuration information for transmitting the SRS is transmitted from the base-station side to the terminal device. In related arts, the terminal device can receive from the network device the configuration information of the SRS when the terminal device is in a connected state. If we want to make the terminal device to transmit the SRS in an idle state or an inactive state, how to configure and transmit the configuration information for transmitting the SRS is an urgent problem to be solved.

SUMMARY

In a first aspect, a method for information configuration for SRS is provided. The method includes receiving configuration information of the SRS from a network device, where the configuration information is for a terminal device to transmit the SRS in a non-connected state.

In a second aspect, a method for information configuration for SRS is provided. The method includes transmitting configuration information of the SRS to a terminal device, where the configuration information is for the terminal device to transmit the SRS in a non-connected state.

In a third aspect, a terminal device is provided. The terminal device includes a receiver. The receiver is configured to receive configuration information of an SRS from a network device, where the configuration information is for the terminal device to transmit the SRS in a non-connected state.

DETAILED DESCRIPTION

Figure 1:
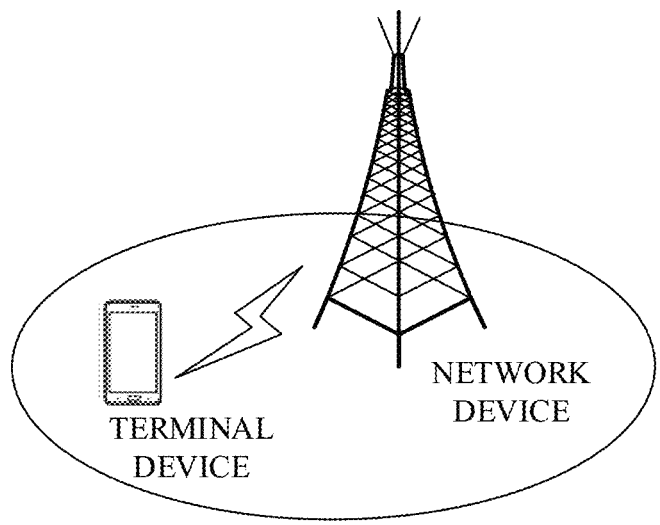
FIG. 1 is a schematic architecture diagram of a wireless communication system provided in implementations of the disclosure.

The technical solutions in implementations of the disclosure will be described below with reference to drawings in the implementations of the disclosure. Obviously, the described implementations are only a part of rather than all the implementations. Based on the implementations of the disclosure, all other implementations obtained by those skilled in the art without creative efforts shall fall within the protection scope of the disclosure.

In implementations of the disclosure, terms such as "exemplary" or "for example" are used as an example or illustration. Any implementations or designs described as "exemplary" or "for example" in the implementations of the disclosure should not be construed as preferred or advantageous over other implementations or designs. Rather, the use of terms such as "exemplary" or "for example" is intended to present the related concepts in a specific manner.

The term "and/or" in this disclosure is only an association relationship to describe the associated objects, indicating that there can be three kinds of relationships, for example, A and/or B can mean that A exists alone, A and B exist at the same time, and B exist alone. The symbol "/" in this disclosure indicates the associated objects are in "or" relation, for example, A/B indicates A or B.

In the description of the disclosure, unless otherwise specified, "multiple" means two or more. The technical solutions provided in the disclosure can be applied to various communication systems, for example, a fifth generation (5G) communication system, a future evolved system, or a variety of combined communication systems, and so on. A variety of application scenarios may be included, such as machine to machine (M2M), D2M, macro-micro communication, enhanced mobile broadband (eMBB), ultra-reliable and ultra-low latency communication (uRLLC) and massive machine-type communication (mMTC) scenarios. For example, the implementations of the disclosure may be applied to communication between a network device and a terminal device in new radio (NR) positioning of the 5G communication system.

In related arts, positioning is widely used in daily life. Requirements for latency and accuracy of the positioning are becoming stricter. In many positioning applications, accurate positioning is generally achieved by a combination of the following technologies:

1) global navigation satellite system (GNSS), based on which position information in an outdoor scenario is provided;
2) radio technology, such as long term evolution (LTE) network, providing multiple options to position a user, a wireless network, a ground beacon system, etc.;
3) inertial measurement units (IMUs) or sensors (for example, tracking a user position based on accelerometer, gyroscope, magnetometer, or vertical positioning using an atmospheric pressure sensor).

These technologies are expected to play an important role in achieving accurate positioning in the future.

Rel-15 NR positioning project defines the cell ID and a wireless access technology-independent (RAT-independent) positioning method based on the LTE positioning protocol (LPP). Rel-16 mainly studies NR standalone RAT-dependent positioning methods, including: downlink-time difference of arrival (DL-TDOA) positioning method, downlink angle of department (DL-AoD) positioning method, uplink-time difference of arrival (UL-TDOA) positioning method, uplink angle of arrival (UL-AoA), round trip time (RTT) positioning method, enhanced cell ID (E-CID) positioning method, etc.

One of the mainly-used reference signals in positioning is a sounding reference signal (SRS) for positioning, SRS for short below. Based on the SRS transmitted from a terminal device, a network can measure time of arrival, signal strength, angle of arrival, etc., so as to determine position information of the terminal device.

Configuration information of the SRS (or referred to as SRS configuration information) is transmitted from the base-station side, which includes configuration information such as a SRS-resource-set type, a transmission period, spatial relation configuration information corresponding to each SRS resource, and a path loss reference signal, etc. All of these information can be configured to the UE through radio resource control (RRC) signaling.

In related arts, the terminal device receives the SRS configuration information transmitted by the network device when the terminal device is in a connected state. If we want to make the terminal device to transmit the SRS in an idle state or an inactive state, how to transmit and ensure the validity of the configuration of the SRS are problems to be solved.

Based on the above problems, implementations of the disclosure provide a method for information configuration for transmitting the SRS. In this method, the terminal device can receive from the network device the configuration information for the terminal device to transmit the SRS in the non-connected state. As such, the terminal device can transmit the SRS in non-connected state according to the received configuration information of the SRS. Thus the terminal device can transmit the SRS in the idle state or the inactive state.

The method for information configuration for transmitting the SRS provided in implementations of the disclosure can be applied in a wireless communication system. For example, FIG. 1 is a schematic architecture diagram of a wireless communication system provided in implementations of the disclosure. In FIG. 1, the wireless communication system includes a terminal device and a network device. In practice, the terminal device and the network device can be wirelessly connected. When the method for information configuration for transmitting the SRS provided in implementations of the disclosure is applied to the wireless communication system of FIG. 1, the network device can transmit the configuration information of the SRS to the terminal device. The configuration information of the SRS is used for the terminal device to transmit the SRS in the non-connected state. After receiving the configuration information for transmitting the SRS, the terminal device can transmit the SRS based on the configuration information when the terminal device is in the non-connected state (which may be the idle state or the inactive state). Thus the terminal device can transmit the SRS in an idle state or the inactive state.

The terminal device in the implementation of the invention can be called user equipment (UE). The terminal device can be a personal communication service (PCS) telephone, a cordless telephone, a session initiation protocol (SIP) telephone, a wireless local loop (WLL) station, a personal digital assistant (PDA) and other devices. The terminal device can also be a mobile phone, a mobile station (MS), a mobile terminal, laptop, etc. The terminal device can communicate with one or more core networks via a radio access network (RAN). For example, the terminal device can be a mobile phone (or a "cellular" phone) or a computer with a mobile terminal. For example, the terminal device can also be a portable, pocket, handheld, computer built-in or vehicle-mounted mobile device that exchanges voice and/or data with the wireless access network. The terminal device can also be a handheld device with a wireless communication function, a computing device, or other processing devices connected to wireless modems, a vehicle-mounted device, a wearable device, a terminal device in the future 5G network, or a terminal device in the future evolving network. The above are described as examples, which are not limited in practice.

The network device in implementation of the disclosure may be an evolved node B (may be referred to as an eNB or an e-NodeB for short), a macro base station, a micro base station (also referred to as a "small base station"), a pico base station, an access point (AP), a transmission point (TP), or a new generation Node B (gNodeB), etc. in the LTE system, NR communication system, or authorized auxiliary access long term evolution (LAA-LTE) system. The network device may also be other types of network devices in the future 5G communication system or future evolution network.

Figure 2:
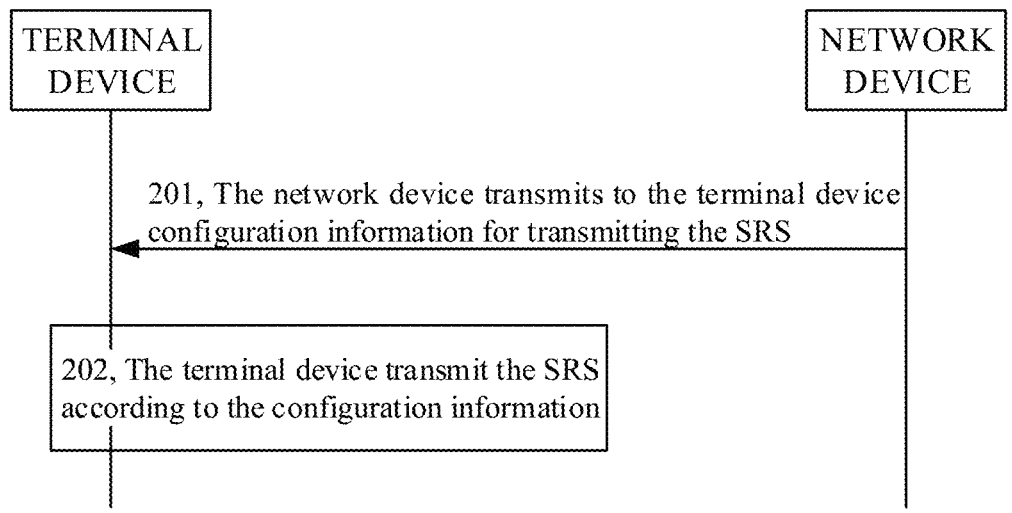
FIG. 2 is a first schematic diagram of a method for information configuration for transmitting an SRS provided in implementations of the disclosure.

As illustrated in FIG. 2, implementations of the disclosure provide a method for information configuration for transmitting an SRS. The method includes the following.

201, a network device transmits configuration information of the SRS to a terminal device.

Correspondingly, the terminal device receives the configuration information of the SRS transmitted by the network device.

The configuration information is for the terminal device to transmit the SRS in a non-connected state.

Optionally, the configuration information includes at least one of following four kinds of information.

1. SRS-Resource-Related Configuration

Optionally, the SRS-resource-related configuration may include one or more of SRS port information, period information, a frequency-domain position, a resource transmission comb, a transmission cyclic shift, a start position of a transmission resource, the number of symbols occupied by the resource, a repetition factor, etc.

2. SRS Resource Type

The SRS resource type includes at least one of periodic SRS, semi-persistent SRS, or aperiodic SRS.

Optionally, the periodic SRS may indicate a first periodicity of transmitting the SRS.

Optionally, the semi-persistent SRS may indicate a target period of time in which the SRS is transmitted, and indicate a second periodicity of transmitting the SRS.

Optionally, the aperiodic SRS may indicate a time for transmitting the SRS.

3. SRS Spatial-Relation-Information Related Configuration

Optionally, the SRS spatial-relation-information related configuration includes one or more of the following:
    a. synchronization signal/PBCH block (SSB) index of a serving cell (SSB-index serving);

b. SSB-index of a neighbor cell (SSB-index);
c. channel state reference signal resource index serving (CSI-RS-index serving);
d. non-zero power channel state reference signal resource ID (NZP-CSI-RS-resource ID);
e. SRS-resource ID; and
f. SRS-positioning resource ID.

4. Path Loss Signal

The path loss signal may include at least one of:
(1) SSB-index serving;
(2) SSB-index;
(3) downlink positioning reference signal (DL-PRS); and
(4) NZP-CSI-RS-resource ID.

Optionally, the configuration information may include at least one SRS resource set, where each SRS resource set includes at least one SRS resource.

In SRS configuration information (SRS-config) in protocols, different SRS resource sets may be indicated by different SRS-resource-group IDs. Different SRS resources may be indicated by different SRS-resource IDs.

The SRS resource may be a time-domain resource and/or a frequency-domain resource occupied for transmitting the SRS.

Optionally, in implementations of the disclosure, the SRS configuration information may be added to the RRC release message in the existing communication protocol, or, added to the SRS configuration information element (that is, SRS-config) in the existing communication protocol.

Optionally, the configuration information may be transmitted through a first dedicated signaling. Optionally, the configuration information may also be transmitted through a broadcast message. Optionally, the configuration information may also be transmitted through the first dedicated signaling and the broadcast message.

Optionally, the first dedicated signaling may be a radio resource control (RRC) signaling.

Optionally, the RRC signaling may be an RRC release message which is used for the network device to release or suspend an RRC connection.

202, the terminal device transmits the SRS according to the configuration information.

In implementations of the disclosure, the terminal device can receive from the network device the configuration information for the terminal device to transmit the SRS in the non-connected state. As such, the terminal device can transmit the SRS in the non-connected state according to the received SRS configuration. Thus the terminal device can transmit the SRS in the idle state or the inactive state.

Figure 3:
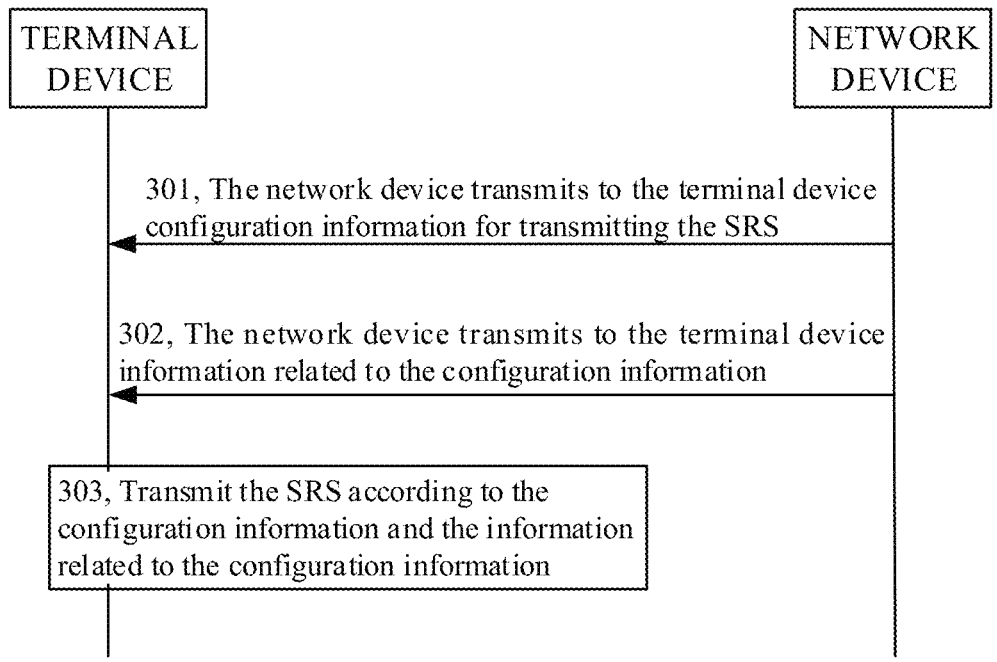
FIG. 3 is a second schematic diagram of a method for information configuration for transmitting an SRS provided in implementations of the disclosure.

As illustrated in FIG. 3, implementations of the disclosure provide a method for information configuration for transmitting an SRS. The method includes the following.

301, a network device transmits configuration information of the SRS to a terminal device.

For description of 301, reference may be made to related description of 201 above, which will not be repeated herein.

302, the network device transmits information related to the configuration information to the terminal device.

Correspondingly, the terminal device receives the information related to the configuration information from the network device.

In implementations of the disclosure, the network device may transmit the configuration information and the information related to the configuration information through a same message to the terminal device. Alternatively, the network device may transmit to the terminal device the configuration information through one message and the information related to the configuration information through another message.

Further, if the network device transmits the configuration information and the information related to the configuration information through two different messages, the message for transmitting the configuration information (hereinafter referred to as the first message) and the message for transmitting the information related to the configuration information (hereinafter referred to as the second message) may be transmitted in any order, which is not limited in implementations of the disclosure. That is, the first message may be transmitted together with the second message; or the first message may be transmitted before the second message; or the second message may be transmitted before the first message.

The information related to the configuration information may include SRS activation information and/or validity information.

In implementations of the disclosure, the terminal device may activate the SRS according to indication of the SRS activation information.

Optionally, the SRS activation information includes at least one of an activation indication of the SRS, an activation time of the SRS, or an activation timer of the SRS.

A duration of the activation timer represents a waiting time for the terminal device to transmit the SRS after receiving the activation information. That is, the SRS is transmitted after the activation timer expires.

Optionally, when the activation timer is configured, a start time of the activation timer may also be configured. For example, the activation timer may be configured with a duration of 5 seconds, and may be set to start 30 milliseconds after the information related to the configuration is received.

Optionally, the activation indication of the SRS may indicate to activate or not activate the SRS.

Optionally, the activation time of the SRS may indicate a specific time to activate the SRS. Specifically, the specific time may be a specified time, a time when the terminal device enters the idle state, or a time when the terminal device enters the inactive state.

Optionally, the activation timer of the SRS may be replaced by a waiting period for activating the SRS. The waiting period for activating the SRS may be a period of time such as 5 milliseconds, 30 milliseconds, or 1 second, etc., which can be set as needed.

For example, if the waiting period for activating the SRS in the SRS activation information received by the terminal device is 1 second, the terminal device may transmit the SRS 1 second after reception of the activation information.

Optionally, in implementations of the disclosure, the SRS may also be activated by an implicit indication, which can be implemented as follows.

In a first optional implementation, the terminal device activates the SRS after receiving the configuration information transmitted by the network device. That is, the terminal device starts to transmit the SRS according to the configuration information after reception of the configuration information from the network device.

In a second optional implementation, the terminal device activates the SRS after receiving the configuration information and the information related to the configuration information transmitted by the network device. That is, the terminal device starts to transmit the SRS according to the configuration information after receiving the configuration information from the network device and receiving the information related to the configuration information from the network device.

Optionally, in the second optional implementation, the information related to the configuration information may be validity information of the configuration information.

In a third optional implementation, the terminal device receives the information related to the configuration information in the connected state, and activates the SRS when entering the non-connected state (i.e., the idle state or inactive state). That is, the terminal starts to transmit the SRS according to the configuration information when entering the non-connected state.

Besides the above three optional implementations, the SRS may also be activated after a certain predetermined period of time, which can be indicated implicitly.

For example, it is pre-agreed (for example, it may be pre-specified in the communication protocol) that the SRS is activated 1 second after receiving the configuration information.

For another example, it is pre-agreed that the SRS is activated 1 second after receiving the configuration information and the information related to the configuration information from the network device. For another example, it is pre-agreed that the terminal device receives the information related to the configuration information in the connected state, and activates the SRS 1 second after entering the non-connected state (i.e., the idle state or inactive state).

Optionally, the validity information includes at least one of a validity period of the configuration information, or valid-area information of the configuration information.

Optionally, besides the validity period of the configuration information and the valid-area information of the configuration information, the validity information may further include a condition to maintain validity of the configuration information. For example, the configuration information is valid when the terminal device is in the idle state, and the configuration information is invalid when the terminal device is in other states (that is, the connected state or the inactive state).

It can be understood that the validity information may further includes other types of information of maintaining validity of the configuration information, which is not limited in implementations of the disclosure.

Optionally, in implementations of the disclosure, a timer may be set, and the duration of the timer may be set to be the validity period of the configuration information. After the timer expires, the configuration information is considered invalid, and transmission of the SRS according to the configuration information will be stopped. Before the timer expires, the SRS may be transmitted according to the configuration information.

Optionally, in implementations of the disclosure, instead of setting the timer, a period of time may be preset. During the period of time, the configuration information is valid, and after the period of time has elapsed, the configuration information is invalid.

In implementations of the disclosure, the granularity of the valid area may be cell, RAN area, tracking area, or SRS-specific area, etc.

Optionally, the valid-area information includes at least one of at least one cell ID, at least one RAN area ID, at least one tracking area ID, or an SRS-specific area ID.

The SRS-specific area may be a valid area pre-agreed for the SRS. The SRS-specific area ID may be an area ID pre-agreed for the SRS.

Optionally, in implementations of the disclosure, if multiple valid areas are indicated in the valid-area information, validity periods of the configuration information corresponding to different valid areas may be further indicated. Assuming that the indicated valid areas include cell A, cell B, and cell C, a validity period of the configuration information for cell A may be indicated to be 1 hour, a validity period of the configuration information for cell B may be indicated to be 1.5 hours, and a validity period of the configuration information for cell C may be indicated to be 3 hours.

In implementations of the disclosure, the terminal device may determine, based on a system message, whether the terminal device is in the valid area indicated by the valid-area information. If the terminal device is in the valid area indicated by the valid-area information, the configuration information is valid and the SRS may be transmitted according to the configuration information. If the terminal device is not in the valid area indicated by the valid-area information, the configuration information is invalid and the transmission of the SRS according to the configuration information will be stopped.

Optionally, the information related to the configuration information may be transmitted through second dedicated signalling. Optionally, the information related to the configuration information may be transmitted through a system message. Optionally, the information related to the configuration information may be transmitted through the second dedicated signaling and the system message.

It should be noted that the valid area may have other granularities, which can be configured as needed.

Optionally, in implementations of the disclosure, the validity period of the configuration information and the valid-area information of the configuration information may be pre-agreed without indication of the above valid information.

Optionally, the second dedicated signaling may be RRC signaling and/or media access control (MAC) signaling.

Optionally, the RRC signaling may be an RRC release message. The MAC signaling may be MAC CE.

303, the SRS is transmitted according to the configuration information and the information related to the configuration information.

In implementations of the disclosure, the terminal device can receive from the network device the configuration information for the terminal device to transmit the SRS in the non-connected state. As such, the terminal device can transmit the SRS in the non-connected state according to the received SRS configuration. Thus the terminal device can transmit the SRS in the idle state or the inactive state.

Figure 4:
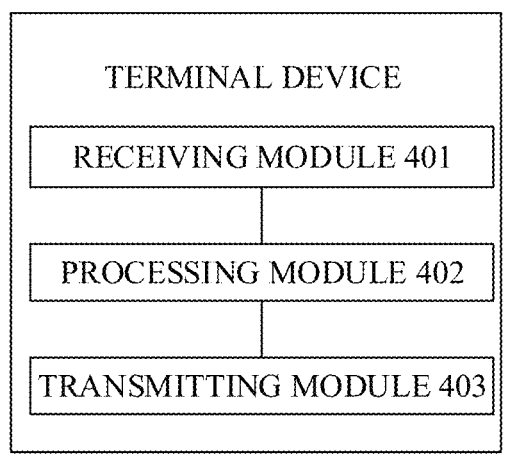
FIG. 4 is a schematic structural diagram of a terminal device provided in implementations of the disclosure.

As illustrated in FIG. 4, implementations of the disclosure provide a terminal device. The terminal device includes a receiving module 401.

The receiving module 401 is configured to receive configuration information of an SRS from a network device, the configuration information being for a terminal device to transmit the SRS in a non-connected state.

Optionally, the configuration information includes at least one of an SRS-resource-related configuration, an SRS resource type, an SRS spatial-relation-information related configuration, or a path loss reference signal.

Optionally, the configuration information includes at least one SRS resource set, where each SRS resource set includes at least one SRS resource.

Optionally, the SRS resource type includes at least one of periodic SRS, semi-persistent SRS, or aperiodic SRS.

Optionally, the receiving module 401 is further configured to receive from the network device information related to the configuration information, the information comprising SRS activation information and/or validity information.

Optionally, the SRS activation information includes at least one of an activation indication of the SRS, an activation time of the SRS, or an activation timer of the SRS, where a duration of the activation timer represents a waiting time for the terminal device to transmit the SRS after receiving the activation information.

Optionally, the validity information includes at least one of a validity period of the configuration information, or valid-area information of the configuration information.

Optionally, the valid-area information includes at least one of at least one cell ID, at least one RAN area ID, at least one tracking area ID, or an SRS-specific area ID.

Optionally, the terminal device further includes a processing module 402 configured to activate the SRS after the receiving module receives the configuration information of the SRS from the network device.

Optionally, the terminal device further includes a processing module 402 configured to activate the SRS when the terminal device enters the non-connected state.

Optionally, the terminal device further includes a transmitting module 403 configured to transmit the SRS according to the configuration information after the receiving module 401 receives the configuration information from the network device for the terminal device to transmit the SRS.

Optionally, the terminal device further includes a transmitting module 403 configured to transmit the SRS according to the configuration information and the information related to the configuration information after the receiving module receives the configuration information from the network device for the terminal device to transmit the SRS and receives the information related to the configuration information from the network device.

Optionally, the configuration information is transmitted through first dedicated signalling, and/or the configuration information is transmitted through a broadcast message.

Optionally, the first dedicated signaling includes an RRC release message.

Optionally, the information related to the configuration information is transmitted through second dedicated signalling; and/or the information related to the configuration information is transmitted through a broadcast message.

Optionally, the second dedicated signaling comprises an RRC release message or a MAC CE.

Figure 5:
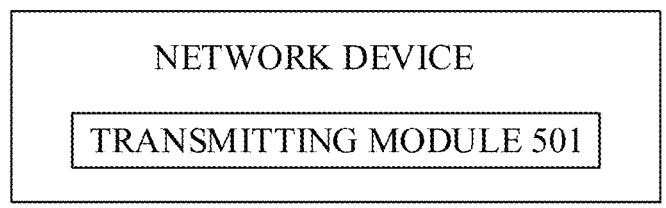
FIG. 5 is a schematic structural diagram of a network device provided in implementations of the disclosure.

As illustrated in FIG. 5, implementations of the disclosure provide a network device. The network device includes a transmitting module 501.

The transmitting module 501 is configured to transmit configuration information of an SRS to a terminal device, the configuration information being for the terminal device to transmit the SRS in a non-connected state.

Optionally, the configuration information includes at least one of an SRS-resource-related configuration, an SRS resource type, an SRS spatial-relation-information related configuration, or a path loss reference signal.

Optionally, the configuration information includes at least one SRS resource set, where each SRS resource set includes at least one SRS resource.

Optionally, the SRS resource type includes at least one of periodic SRS, semi-persistent SRS, or aperiodic SRS.

Optionally, the transmitting module 502 is further configured to transmit to the terminal device information related to the configuration information, the information comprising SRS activation information and/or validity information.

Optionally, the SRS activation information includes at least one of an activation indication of the SRS, an activation time of the SRS, or an activation timer of the SRS, where a duration of the activation timer represents a waiting time for the terminal device to transmit the SRS after receiving the activation information.

Optionally, the validity information includes at least one of a validity period of the configuration information, or valid-area information of the configuration information.

Optionally, the valid-area information includes at least one of at least one cell ID, at least one RAN area ID, at least one tracking area ID, or an SRS-specific area ID.

Optionally, the configuration information is transmitted through first dedicated signalling, and/or the configuration information is transmitted through a broadcast message.

Optionally, the first dedicated signaling includes an RRC release message.

Optionally, the information related to the configuration information is transmitted through second dedicated signalling; and/or the information related to the configuration information is transmitted through a broadcast message.

Optionally, the second dedicated signaling comprises an RRC release message or a MAC CE.

Implementations of the disclosure further provide a network device. The network device includes a memory storing executable program codes and a processor coupled with the memory. The processor invokes the executable program codes stored in the memory to execute the method of information configuration performed by the network device in the implementations of the disclosure.

Figure 6:
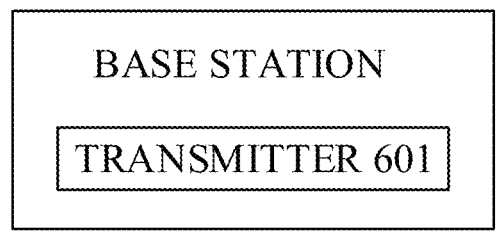
FIG. 6 is a schematic structural diagram of a base station provided in implementations of the disclosure.

As illustrated in FIG. 6, the network device in the implementations of the disclosure may be a base station. The base station may include a transmitter 601. The transmitter 601 is configured to transmit configuration information of an SRS to a terminal device, the configuration information being for the terminal device to transmit the SRS in a non-connected state.

Optionally, the configuration information includes at least one of an SRS-resource-related configuration, an SRS resource type, an SRS spatial-relation-information related configuration, or a path loss reference signal.

Optionally, the configuration information includes at least one SRS resource set, where each SRS resource set includes at least one SRS resource.

Optionally, the SRS resource type includes at least one of periodic SRS, semi-persistent SRS, or aperiodic SRS.

Optionally, the transmitter 601 is further configured to transmit to the terminal device information related to the configuration information, the information comprising SRS activation information and/or validity information.

Optionally, the SRS activation information includes at least one of an activation indication of the SRS, an activation time of the SRS, or an activation timer of the SRS, where a duration of the activation timer represents a waiting time for the terminal device to transmit the SRS after receiving the activation information.

Optionally, the validity information includes at least one of a validity period of the configuration information, or valid-area information of the configuration information.

Optionally, the valid-area information includes at least one of at least one cell ID, at least one RAN area ID, at least one tracking area ID, or an SRS-specific area ID.

Optionally, the configuration information is transmitted through first dedicated signalling, and/or the configuration information is transmitted through a broadcast message.

Optionally, the first dedicated signaling includes an RRC release message.

Optionally, the information related to the configuration information is transmitted through second dedicated signaling; and/or the information related to the configuration information is transmitted through a broadcast message.

Optionally, the second dedicated signaling comprises an RRC release message or a MAC CE.

Figure 7:
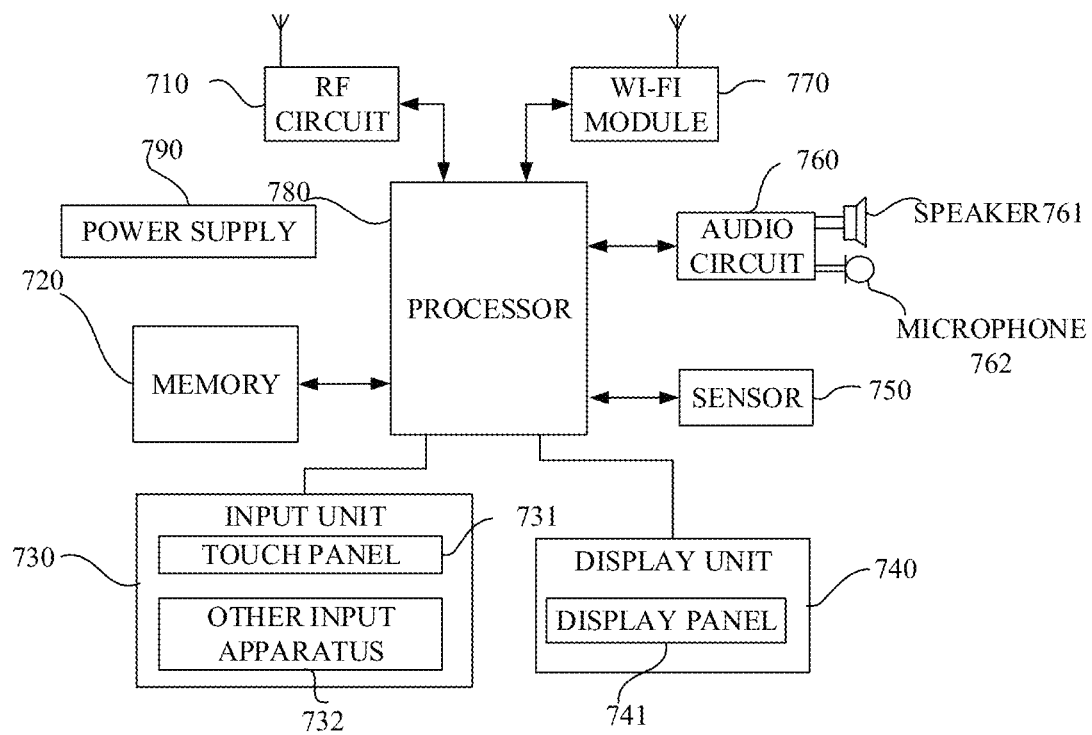
FIG. 7 is a schematic structural diagram of a mobile phone provided in implementations of the disclosure.

Exemplarily, the terminal device in implementations of the disclosure may be a mobile phone. As illustrated in FIG. 7, the mobile phone may include a radio frequency (RF) circuit 710, a memory 720, an input unit 730, a display unit 740, a sensor 750, an audio circuit 760, a wireless fidelity (Wi-Fi) module 770, a processor 780, a power supply 790, etc. The RF circuit 710 includes a receiver 711 and a transmitter 712. Those skilled in the art can understand that the structure of the mobile phone illustrated in FIG. 7 does not constitute a limitation on the mobile phone, and may include more or less components than illustrated, some components may be combined, or components may be differently arranged.

The RF circuit 710 may be configured to receive and transmit signals during transmission and reception of information or during a call. In particular, after receiving the downlink information from the base station, the RF circuit 710 passes the downlink information to the processor 780 for processing. In addition, the RF circuit 710 transmits the uplink data to the base station. Typically, the RF circuit 710 includes, but is not limited to, an antenna, at least one amplifier, a transceiver, a coupler, a low noise amplifier (LNA), a duplexer, and the like. In addition, the RF circuitry 710 may also communicate with networks and other devices via wireless communications. The above wireless communication can be performed with any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and so on.

The memory 720 may be configured to store software programs and modules. The processor 780 executes various functional applications and data processing of the mobile phone by running the software programs and modules stored in the memory 720. The memory 720 may mainly include a stored-program area and a stored-data area, where the stored-program area may store an operating system, an application program (such as a sound playback function, an image playback function, etc.) required for at least one function, and the like, and the stored-data area may store data created by the use of the mobile phone (such as audio data, phone book, etc.), etc. Additionally, the memory 720 may include high-speed random access memory, and may also include non-volatile memory, such as at least one magnetic disk storage device, flash memory device, or other volatile solid state storage device.

The input unit 730 may be configured to receive inputted numerical or character information, and generate key signal input related to user setting and function control of the mobile phone. Specifically, the input unit 730 may include a touch panel 731 and other input devices 732. The touch panel 731, also referred to as a touch screen, may collect touch operations by the user on or near the touch panel 731 (such as the operation of the user on or near the touch panel 731 using any suitable object or accessory such as a finger, a stylus, etc.), and drive a corresponding connection device according to a preset program. Optionally, the touch panel 731 may include two parts, a touch detection apparatus and a touch controller. The touch detection apparatus detects a touch orientation of the user, detects a signal generated from the touch operation, and transmits the signal to the touch controller. The touch controller receives the touch information from the touch detection apparatus, converts the signal into contact coordinates, and then transmits the contact coordinates to the processor 780, and can receive and execute a command from the processor 780. In addition, the touch panel 731 can be implemented in various types such as resistive, capacitive, infrared, and surface acoustic waves. In addition to the touch panel 731, the input unit 730 may further include other input devices 732. Specifically, other input devices 732 may include, but are not limited to, one or more of physical keyboards, function keys (such as volume control keys, switch keys, etc.), trackballs, mice, joysticks, and the like.

The display unit 740 may be configured to display information input by the user, information provided to the user, or various menus of the mobile phone. The display unit 740 may include a display panel 741. Optionally, the display panel 741 may be configured in the form of a liquid crystal display (LCD), an organic light-Emitting diode (OLED), or the like. Further, the touch panel 731 can cover the display panel 741. When the touch panel 731 detects a touch operation on or near the touch panel, the touch panel 731 transmits the detection result to the processor 780 to determine a type of the touch event, and then the processor 780 provides corresponding visual output on display panel 741 according to the type of the touch event. Although in FIG. 7, the touch panel 731 and the display panel 741 are used as two independent components to realize the input and input functions of the mobile phone, in some implementations, the touch panel 731 and the display panel 741 can be integrated together to realize the input and output functions of the mobile phone.

The mobile phone may also include at least one sensor 750, such as a light sensor, a motion sensor, and other sensors. Specifically, the light sensor may include an ambient light sensor and a proximity sensor, where the ambient light sensor may adjust brightness of the display panel 741 according to brightness of the ambient light, and the proximity sensor may turn off the display panel 741 and/or backlight when the mobile phone is moved to the ear. As a kind of motion sensor, the accelerometer sensor can detect the magnitude of acceleration in all directions (usually three axes), and can detect the magnitude and direction of gravity when stationary, and can be used for applications that recognize the posture of mobile phones (such as horizontal and vertical screen switching, related games, magnetometer attitude calibration), vibration recognition related functions (such as pedometer, tapping), etc. Other sensors such as gyroscope, barometer, hygrometer, thermometer, infrared sensor, etc. will not be detailed herein.

The audio circuit 760, the speaker 761, and the microphone 762 can provide audio interfaces between the user and the mobile phone. The audio circuit 760 can convert the received audio data into an electrical signal, and transmit the electrical signal to the speaker 761. The speaker 761 converts the electrical signal into a sound signal for output. On the other hand, the microphone 762 converts the collected sound signal into an electrical signal, which is received and converted into audio data by the audio circuit 760. Then the audio data is output to the processor 780 for processing. After the processing, the audio data is transmitted for example to another mobile phone through the RF circuit 710, or the audio data is output to the memory 720 for further processing.

Wi-Fi is a short-distance wireless transmission technology. The mobile phone can help users to send and receive emails, browse web pages, and access streaming media through the Wi-Fi module 770, which provides users with wireless broadband Internet access. Although FIG. 7 illustrates the Wi-Fi module 770, it can be understood that it is not an essential component of the mobile phone, and can be completely omitted as required within the scope of not changing the essence of the disclosure.

The processor 780 is the control center of the mobile phone, which can execute various functions of the mobile phone and process data using various interfaces and lines to connect various parts of the entire mobile phone, by running or executing the software programs and/or modules stored in the memory 720 and calling the data stored in the memory 720, so as to monitor the mobile phone as a whole. Optionally, the processor 780 may include one or more processing units. Preferably, the processor 780 may integrate an application processor and a modem processor, where the application processor mainly processes the operating system, user interface, and application programs, etc., and the modem processor mainly deals with wireless communication. It can be understood that, the above-mentioned modem processor may not be integrated into the processor 780.

The mobile phone also includes a power supply 790 (such as a battery) for supplying power to various components. Preferably, the power supply can be logically connected to the processor 780 through a power management system, so as to manage charging, discharging, and power consumption management functions through the power management system. Although not illustrated, the mobile phone may also include a camera, a Bluetooth module, and the like, which will not be repeated here.

In implementations of the disclosure, the RF circuit 710 is further configured to receive configuration information of an SRS from a network device, the configuration information being for a terminal device to transmit the SRS in a non-connected state.

The RF circuit 710 is further configured to receive information related to the configuration information from the network device, such as SRS activation information and/or validity information.

The RF circuit 710 is further configured to transmit the SRS according to the configuration information, after receiving the configuration information from the network device for the terminal device to transmit the SRS.

The RF circuit 710 is further configured to transmit the SRS according to the configuration information and the information related to the configuration information, after receiving the configuration information from the network device for the terminal device to transmit the SRS and receiving the information related to the configuration information from the network device.

Optionally, the configuration information includes at least one of an SRS-resource-related configuration, an SRS resource type, an SRS spatial-relation-information related configuration, or a path loss reference signal.

Optionally, the configuration information includes at least one SRS resource set, where each SRS resource set includes at least one SRS resource.

Optionally, the SRS resource type includes at least one of periodic SRS, semi-persistent SRS, or aperiodic SRS.

Optionally, the SRS activation information includes at least one of an activation indication of the SRS, an activation time of the SRS, or an activation timer of the SRS, where a duration of the activation timer represents a waiting time for the terminal device to transmit the SRS after receiving the activation information.

Optionally, the validity information includes at least one of a validity period of the configuration information, or valid-area information of the configuration information.

Optionally, the valid-area information includes at least one of at least one cell ID, at least one RAN area ID, at least one tracking area ID, or an SRS-specific area ID.

The processor 780 is further configured to activate the SRS after the RF circuit 710 receives the configuration information of the SRS from the network device.

The processor 780 is further configured to activate the SRS when the terminal device enters the non-connected state.

Optionally, the configuration information is transmitted through first dedicated signalling, and/or the configuration information is transmitted through a broadcast message.

Optionally, the first dedicated signaling includes an RRC release message.

Optionally, the information related to the configuration information is transmitted through second dedicated signalling; and/or the information related to the configuration information is transmitted through a broadcast message.

Optionally, the second dedicated signaling comprises an RRC release message or a MAC CE.

Implementations of the disclosure further provide a computer-readable storage medium, which includes computer instructions which, when running in a computer, cause the computer to execute the various processes for the terminal device in the above method implementations.

Implementations of the disclosure further provide a computer-readable storage medium, which includes computer instructions which, when running in a computer, cause the computer to execute the various processes for the network device in the above method implementations.

Implementations of the disclosure further provide a computer program product, which includes computer instructions. When the computer program is running in a computer, the computer executes the computer instructions that cause the computer to execute the various processes for the terminal device in the above method implementations.

Implementations of the disclosure further provide a computer program product, which includes computer instructions. When the computer program is running in a computer, the computer executes the computer instructions that cause the computer to execute the various processes for the network device in the above method implementations.

Implementations of the disclosure further provide a chip couple with the memory in the terminal device, such that the chip can invoke program instruction stored in the memory to cause the terminal device to execute the various processes for the terminal device in the above method implementations.

Implementations of the disclosure further provide a chip couple with the memory in the network device, such that the chip can invoke program instruction stored in the memory to cause the network device to execute the various processes for the network device in the above method implementations.

The above-described implementations may be implemented in whole or in part by software, hardware, firmware, or any combination thereof. When implemented in software, it can be implemented in whole or in part in the form of a computer program product. A computer program product includes one or more computer instructions. When the computer program instructions are loaded and executed on a computer, the procedures or functions according to the implementations of the disclosure are achieved in whole or in part. The computer may be a general purpose computer, a special purpose computer, a computer network, or other programmable device. Computer instructions may be stored in or transmitted from one computer-readable storage medium to another computer-readable storage medium, for example, the computer instructions may be transmitted from a website site, computer, server, or data center over a wire (e.g. coaxial cable, fiber optic, digital subscriber line (DSL)) or wireless (e.g. infrared, wireless, microwave, etc.) to another website site, computer, server or data center. The computer-readable storage medium can be any available medium that can be stored by a computer or a data storage device such as a server, a data center, etc. that includes one or more available media integrated. The available medium may be magnetic media (e.g., floppy disk, hard disk, magnetic tape), optical media (e.g., DVD), or semiconductor media (e.g., Solid State Disk (SSD)).

The terms "first", "second", "third", "fourth", etc. (if any) in the description and claims of the disclosure and the above-mentioned drawings are used to distinguish similar objects and are not necessarily used to describe a specific order or sequence. It is to be understood that data so used may be interchanged under appropriate circumstances so that the implementations described herein can be practiced in sequences other than those illustrated or described herein. Furthermore, the terms "including" and "having" and any variations thereof, are intended to cover non-exclusive inclusion, for example, a process, method, system, product or device including a series of steps or units is not necessarily limited to those expressly listed. Rather, those steps or units may include other steps or units not expressly listed or inherent to these processes, methods, products or devices.

What is claimed is:

1. A method for information configuration, the information being for transmitting a sounding reference signal (SRS), the method comprising:
   receiving configuration information of the SRS from a network device, the configuration information being for a terminal device to transmit the SRS in a non-connected state, wherein the configuration information comprises an SRS resource type and a path loss reference signal; and
   receiving from the network device information related to the configuration information, the information comprising validity information, and the validity information comprising a validity period of the configuration information and valid-area information of the configuration information.

2. The method of claim 1, wherein the configuration information further comprises at least one of:
   an SRS-resource-related configuration, or an SRS spatial-relation-information related configuration.

3. The method of claim 1, wherein the SRS resource type comprises at least one of:
   periodic SRS, or semi-persistent SRS.

4. The method of claim 1, wherein the configuration information is transmitted through first dedicated signalling.

5. The method of claim 4, wherein the first dedicated signaling comprises a radio resource control (RRC) release message.

6. A method for information configuration, the information being for transmitting a sounding reference signal (SRS), the method comprising:
   transmitting configuration information of the SRS to a terminal device, the configuration information being for the terminal device to transmit the SRS in a non-connected state, wherein the configuration information comprises an SRS resource type and a path loss reference signal; and
   transmitting to the terminal device information related to the configuration information, the information comprising validity information, and the validity information comprising a validity period of the configuration information and valid-area information of the configuration information.

7. The method of claim 6, wherein the configuration information further comprises at least one of:
   an SRS-resource-related configuration, or an SRS spatial-relation-information related configuration.

8. The method of claim 6, wherein the SRS resource type comprises at least one of:
   periodic SRS, or semi-persistent SRS.

9. The method of claim 6, wherein the configuration information is transmitted through first dedicated signalling.

10. The method of claim 9, wherein the first dedicated signaling comprises a radio resource control (RRC) release message.

11. A terminal device, comprising:
    a receiver configured to receive configuration information of a sounding reference signal (SRS) from a network device, the configuration information being for a terminal device to transmit the SRS in a non-connected state, wherein the configuration information comprises an SRS resource type and a path loss reference signal, and the SRS resource type comprises at least one of: periodic SRS, or semi-persistent SRS, and receive from the network device information related to the configuration information, the information comprising validity information, and the validity information comprising a validity period of the configuration information and valid-area information of the configuration information.

12. The terminal device of claim 11, wherein the configuration information is transmitted through first dedicated signalling.

13. The terminal device of claim 12, wherein the first dedicated signaling comprises a radio resource control (RRC) release message.

* * * * *